US 6,540,096 B1

(12) United States Patent
Bazany et al.

(10) Patent No.: US 6,540,096 B1
(45) Date of Patent: *Apr. 1, 2003

(54) COLLAPSIBLE CONTAINER WITH INTEGRALLY SUPPORTED DUNNAGE AND SIDE ENTRY

(75) Inventors: Donald J. Bazany, Grand Haven, MI (US); Judson A. Bradford, Holland, MI (US)

(73) Assignee: Bradford Company, Holland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/583,486

(22) Filed: May 31, 2000

Related U.S. Application Data

(60) Continuation-in-part of application No. 09/532,580, filed on Mar. 22, 2000, now Pat. No. 6,230,916, which is a division of application No. 09/033,680, filed on Mar. 3, 1998, now Pat. No. 6,062,410, which is a division of application No. 08/608,476, filed on Feb. 28, 1996, now Pat. No. 5,725,119.

(51) Int. Cl.[7] .................................................. B65D 6/18
(52) U.S. Cl. ...................... 220/6; 206/583; 220/23.83; 220/530; 220/1.6
(58) Field of Search ........................ 220/6, 7, 1.6, 909, 220/23.83, 23.86, 530; 206/583, 425

(56) References Cited

U.S. PATENT DOCUMENTS

| 1,507,977 | A | 9/1924 | Schaefer |
| 1,712,168 | A | 5/1929 | Rand |
| 1,768,467 | A | 6/1930 | Hutchinson et al. |
| 2,018,605 | A | 10/1935 | Craig |
| 2,608,339 | A | 8/1952 | Benzon-Petersen |
| 2,720,998 | A | 10/1955 | Potter |
| 3,467,247 | A | 9/1969 | Weiss |
| 3,940,018 | A | 2/1976 | Scholle |
| 4,527,694 | A | 7/1985 | Bolt et al. |
| 4,574,950 | A | 3/1986 | Koe et al. |
| 4,685,571 | A | 8/1987 | Hoss |
| 4,798,304 | A | 1/1989 | Rader |
| 4,946,036 | A | 8/1990 | Kupersmit |
| 5,211,290 | A | 5/1993 | Janus et al. |
| 5,238,139 | A | 8/1993 | Bisceglia |
| 5,437,384 | A | 8/1995 | Farrell |
| 5,725,119 | A | 3/1998 | Bradford et al. |
| 6,062,410 | A | 5/2000 | Bradford et al. |

Primary Examiner—Joseph M. Moy
(74) Attorney, Agent, or Firm—Wood, Herron & Evans, LLP

(57) ABSTRACT

A reusable and returnable container for holding product therein during shipment and then being returned for reuse comprises a body having at least two opposing and moveable side structures, which are configured for being selectively moved into an erected position for shipment and moved into a collapsed position for reducing the size of the container for return. A dunnage structure spans between the side structures and is operably coupled to the side structures for moving to an erected position for receiving product when the side structures are erected and moving to a collapsed position in the body when the side structures are collapsed so that the dunnage remains with the container when returned. The dunnage structure has an open end facing at least one side structure of the body, and the side structure defines an open area which is in alignment with the dunnage structure open end for accessing the dunnage structure and transferring product into and out of the dunnage structure from a side of the container.

20 Claims, 5 Drawing Sheets

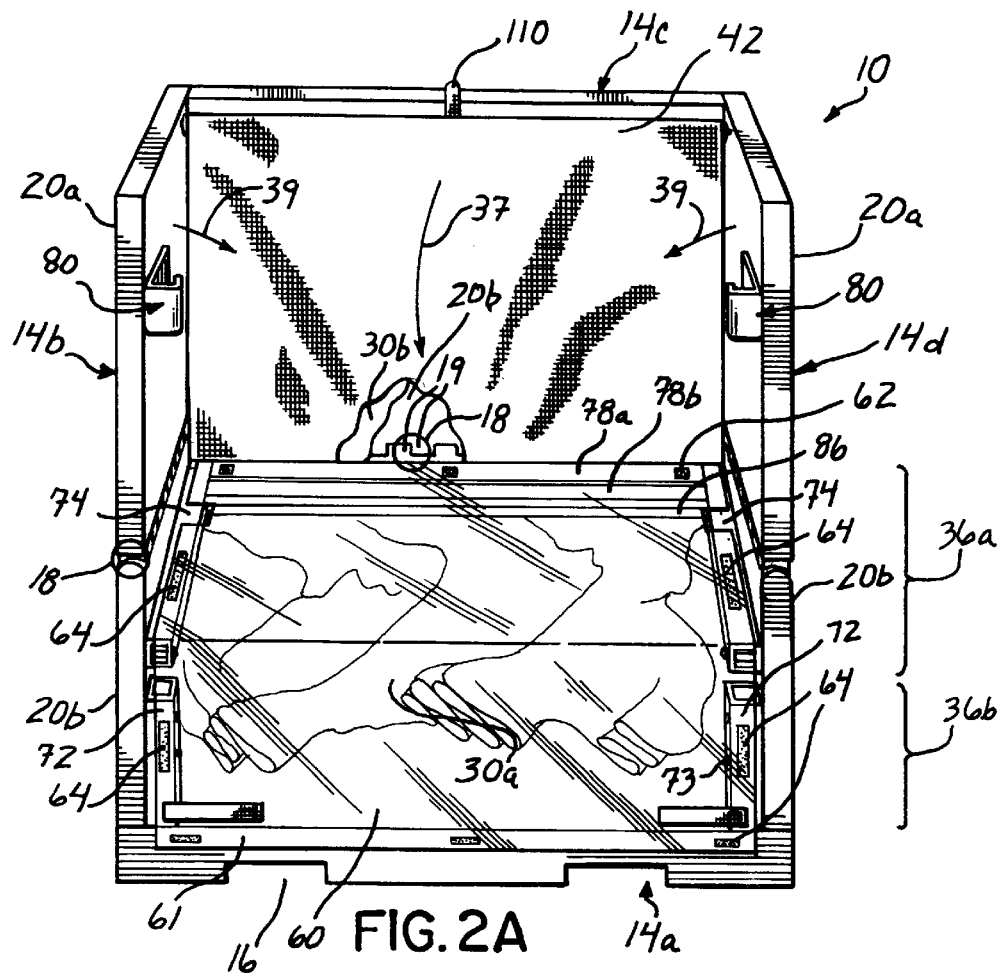
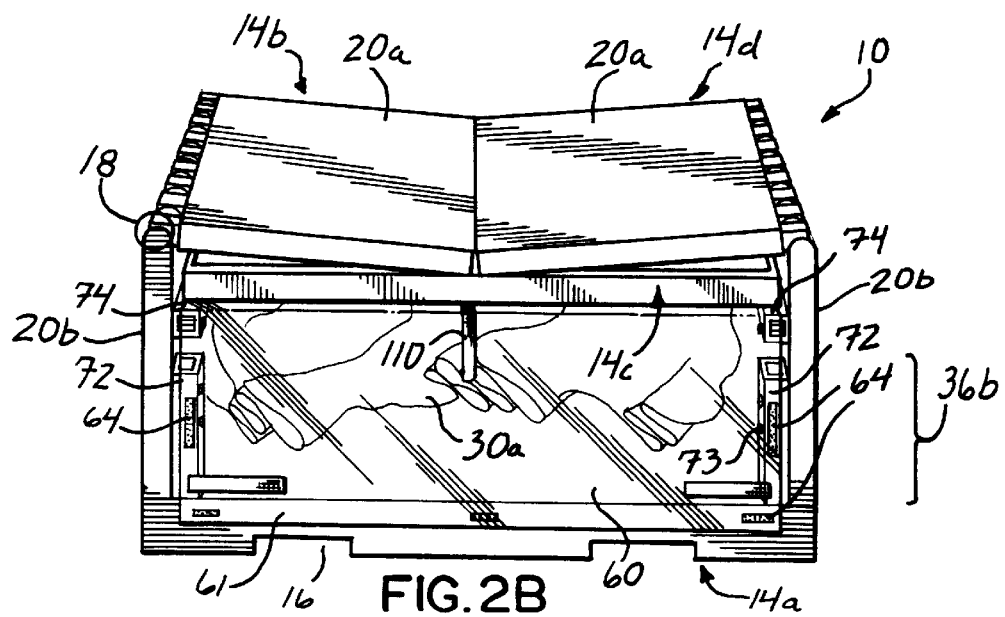

COLLAPSIBLE CONTAINER WITH INTEGRALLY SUPPORTED DUNNAGE AND SIDE ENTRY

RELATED APPLICATIONS

This application is a continuation-in-part application of U.S. patent application, Ser. No. 09/532,580, filed Mar. 22, 2000, entitled "Collapsible Container With Integrally Supported Dunnage," now U.S. Pat. No. 6,230,916, which is a divisional application of U.S. patent application Ser. No. 09/033,680, filed Mar. 3, 1998, entitled "Collapsible Container with Integrally Supported Dunnage," now U.S. Pat. No. 6,062,410, which is a divisional application of U.S. patent application, Ser. No. 08/608,476, filed Feb. 28, 1996, entitled "Collapsible Container With Integrally Supported Dunnage," now U.S. Pat. No. 5,725,119, all such patents being incorporated herein by reference.

FIELD OF THE INVENTION

The present invention relates generally to shipping containers used to ship products, and more specifically to collapsible containers which are returnable in an empty state for reuse.

BACKGROUND OF THE INVENTION

Returnable and reusable containers are utilized by manufacturers to ship a variety of different products to end users, such as assembly plants. For example, in the automobile industry, in particular, an assembly plant which is assembling a particular automobile or other vehicle utilizes parts from a number of different parts manufacturers or suppliers. These suppliers ship their respective parts to the assembly plant in reusable containers, and the parts are then removed from the containers and assembled together into a finished product, such as an automobile. The empty reusable containers are then returned to the parts suppliers for use in subsequent shipments of parts.

The return and reuse of empty containers results in a substantial cost savings for the supplier and or the end manufacturer or assembler, as may be appreciated, because reuse reduces the number of new containers which must be purchased. Furthermore, the returned containers alleviate the assembly plant's task of having to store, destroy, or otherwise dispose of the containers, thus resulting in further cost savings to the plant.

While returnable and reusable containers reduce costs by eliminating the need to constantly purchase new containers and reducing disposal costs, it may still be relatively costly to provide for their return shipment. The shipping charge rate for return shipment of the empty containers is based upon the volume of the container and upon the number of containers which might be situated in a return vehicle, such as a truck. With conventional containers used in the past, there has been a one-to-one (1:1) return-to-shipment ratio because an empty container occupies the same shipping space or volume as a full container.

Therefore, there is essentially not much of a shipping cost savings when returning an empty reusable container even though the empty container weighs less because it does not contain product.

Furthermore, the cost of storing conventional reusable containers may further reduce the other economic benefits they offer because empty containers also require the same warehouse or storage space as full containers. Container storage may be necessary at the plant before return shipment can be arranged. Similarly, the supplier will also store the containers on site to have them on hand and ready for shipment. Storage space is valuable and often limited, and it is usually desirable to utilize the space for something other than bulky, empty containers waiting to be shipped or returned. Therefore, the economic benefits provided by currently available reusable containers is reduced by the cost, both to the end user assembly plant and supplier, of return shipment and pre-return or post-return storage space requirements.

Some currently available reusable containers have addressed such problems by being collapsible into a smaller size or volume to thereby require less space when returned or stored. For example, some available reusable containers are collapsible into a volume essentially one-third ($\frac{1}{3}$) or one-fourth ($\frac{1}{4}$) of their volume when shipped full of product. This provides a three-to-one (3:1) or four-to-one (4:1) return-to-shipment ratio, and thus, provides a substantial savings in return shipment costs. That is, a truck returning the containers to the originating site can carry three or four times the number of empty, collapsed containers as full containers. Additionally, collapsed, stored containers require substantially less storage space.

While such containers address the issue of return shipment and storage costs, they still have certain drawbacks. For example, for the containers to be collapsible, it is necessary to utilize separate dunnage elements, such as partitions or separating structures, in the container during shipment. Dunnage elements are used for separating and protecting the products shipped in the container. The separate dunnage elements must be handled accordingly apart from the container during shipment and return. That is, when the container has been assembled into an erected form for shipment and dunnage elements are to be utilized, the dunnage must be separately inserted and secured within the container. Subsequently, prior to return shipment, any dunnage elements utilized within the container must be detached and removed therefrom before the container can be collapsed into the smaller, returnable shape. As may be appreciated, the dunnage elements are then discarded or otherwise disposed of by the assembly plant adding to the plant's overall cost for the shipment. Furthermore, the supplier must construct or acquire new dunnage elements each time the returned container is reused for shipment and thus must incur the necessary costs associated therewith.

Additionally, the labor costs associated with constructing and installing dunnage elements in a container, and the additional labor for collapsing, removing and disposing of the dunnage elements after shipment, further increases the overall cost of shipping a product utilizing conventional containers. Therefore, even with existing collapsible, returnable containers, high shipping costs are incurred on both ends, i.e., by the supplier who constantly acquires new dunnage elements and by the assembly plant which constantly must dispose of the old dunnage elements or pay to have those dunnage elements returned with the container.

Access to the product in the containers is also a particular concern. Specifically, in the automotive industry, the containers full of product are positioned on an assembly line adjacent to a work area which is associated with a particular product to be installed on a manufactured vehicle. At a line position or station where interior door panels are installed onto a door, a container full of door panels is positioned at the station for access by the line worker. The product or part is taken directly from the container and is used on the line. However, some existing containers have been difficult to access when moving the parts therefrom to the installation.

As will be appreciated, a line worker only has a certain amount of time to install a part. Any delay in accessing a part is undesirable. Furthermore, the repetitive motion of accessing parts to install on a vehicle should not be difficult or straining to the line worker since it must be done very many times during a shift. Some existing containers have not adequately addressed such concerns.

Some existing products have recognized some of the needs in the art discussed above and have provided returnable, collapsible containers with integral dunnage. For example, U.S. Pat. No. 5,725,119, which is co-owned with the present application, illustrates various containers and structures. While such products have provided many desirable benefits, such as reducing overall container and shipping costs, it is still desirable to improve on the current art.

Accordingly, it is an objective of the present invention to reduce the overall shipping costs normally associated with shipping product. It is another objective to reduce such shipping costs associated with both original shipment and return shipment.

It is further an objective of the present invention to provide a returnable and reusable container which adequately contains and protects product shipped therein and will occupy less space during return shipment than during original shipment.

It is another objective to assist the end user of the product within the container and to provide easy and ready access to the product.

It is further an objective of the present invention to reduce the supplier's time and labor costs associated with erecting a container and constructing and securing dunnage elements therein to protect the shipped product.

It is still another objective to reduce the supplier's replacement costs of dunnage elements for returned, reusable containers.

It is an additional objective to reduce storage space requirements associated with reusable containers and/or dunnage materials.

It is still another objective of the present invention to reduce the time and labor costs to the assembly plant associated with removing, dismantling and discarding used dunnage elements prior to collapsing and returning empty containers.

These objectives and other objectives will become more readily apparent from the further description of the invention below.

SUMMARY OF THE INVENTION

The above objectives and other objectives are addressed by the present invention, which provides a reusable and returnable container for holding product therein which may be erected for shipment and then collapsed and returned for reuse. The present invention thus reduces shipping costs associated with such containers and further reduces the shipping and storage space required for such containers.

The container comprises a body having at least two opposing and moveable side structures, such as side walls. In one embodiment, the container forms a box-like structure and has four side structures. The side structures are configured for being selectively moved into an erected position for product shipment and then moved into a collapsed position for reducing the size of the empty container for return shipment. In one embodiment of the invention, the return-to-shipment ratio is approximately 2:1.

For containing product within the container, a dunnage structure spans between at least two side structures and is operably coupled to the side structures for moving to an erected position for receiving product when the side structures are erected. The dunnage structure also moves to its collapsed position in the body when the side structures are collapsed, so that the dunnage structure remains with the container when returned. In that way, the dunnage structure in the inventive container is also reusable, reducing replacement costs for such dunnage, and also reducing the labor costs associated with handling and discarding used dunnage elements from a container and assembling new dunnage elements prior to the container being loaded with product and shipped.

The dunnage structure has an open end facing at least one side structure of the body. The side structure defines an open area which is in alignment with the dunnage structure open end for providing access to the dunnage structure and the product within the dunnage structure from the side of the container. Therefore, the product in the container may be transferred into and out of the container from a side thereof. As a result, access to the product is easily and readily obtained. The present invention is particularly useful for assembly line use as the product in the container may be removed and transferred to an assembly line in one smooth movement. Furthermore, unnecessary lifting of the product is reduced to further assist an assembly line worker or other person using the shipped products.

In one particular embodiment of the invention, the side structure defining the open area comprises a frame with multiple sections. The frame surrounds at least one side of the container and defines the side structure with an open area which overlies or aligns with an open end of the dunnage structure. Certain sections of the frame are hingedly coupled with respect to the body to be moved between a collapsed and erected position. A latching structure coupled to the body secures the side structure frame in an erected position. Preferably, two opposing latching structures are located on either end of the side structure so that it is secured on both ends.

In one embodiment of the invention, the latching structure comprises an aperture. The side structure comprises a member, such as a latching bar, which is configured to engage the aperture. More particularly, the aperture may be a slot and the ends of the bar slide into the slot. The bar ends sit within the slots when the side structure is in an erected position. The latching bar is lifted to disengage the ends from the slots and allow the side structure to be collapsed. In one embodiment, the latching bar is biased downwardly, into the slots, either by weight or a spring bias.

In accordance with another aspect of the invention, a generally transparent cover overlies the open area of the side structure for closing the side structure while providing visual access to the dunnage structure and any contents therein. When the container is collapsed, a portion of the transparent cover acts as a dust cover to prevent dust and contaminants from entering the collapsed container.

In accordance with another aspect of the present invention, the dunnage structure comprises a plurality of pouches which are coupled at their ends to opposing side structures. Specifically, rails extend along the upper edges of the side structures and the dunnage pouches are coupled to the rails. In one embodiment, the dunnage pouches are slidably coupled to the rails. The pouches may be sealed at their top, or be open at the top, to allow both top access and side access to products within the pouches.

The side structure in the container opposing the open end of the dunnage structure is held in position by slidable latches at either end thereof. The slidable latches have one or more projections which slide into slots in the adjacent side structure for securing the side structures in the erected position. An actuating mechanism is coupled to each of the latches such that both of the latches are disengaged simultaneously when the actuating mechanism is actuated. In one embodiment of the invention, the actuating mechanism is comprised of a cord which may be pulled to simultaneously disengage the latches. In another embodiment, a lever may be rotated to simultaneously disengage each of the latches so that the side structure may be collapsed. The latching structure and the opposing slidable latches may each be accessed from the open side of the container so that the container may be readily collapsed without requiring a worker to walk around the container. In that way, time and associated labor costs are saved.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

FIG. 2A is a side view of the embodiment of FIG. 1 showing one side structure in a collapsed position with the dunnage structure in a partially collapsed position in accordance with the principles of the present invention;

FIG. 2B is a side view similar to FIG. 2A showing all of the side structures in a collapsed position so that the entire container is collapsed and ready for return shipment.

DETAILED DESCRIPTION

Figure 1:
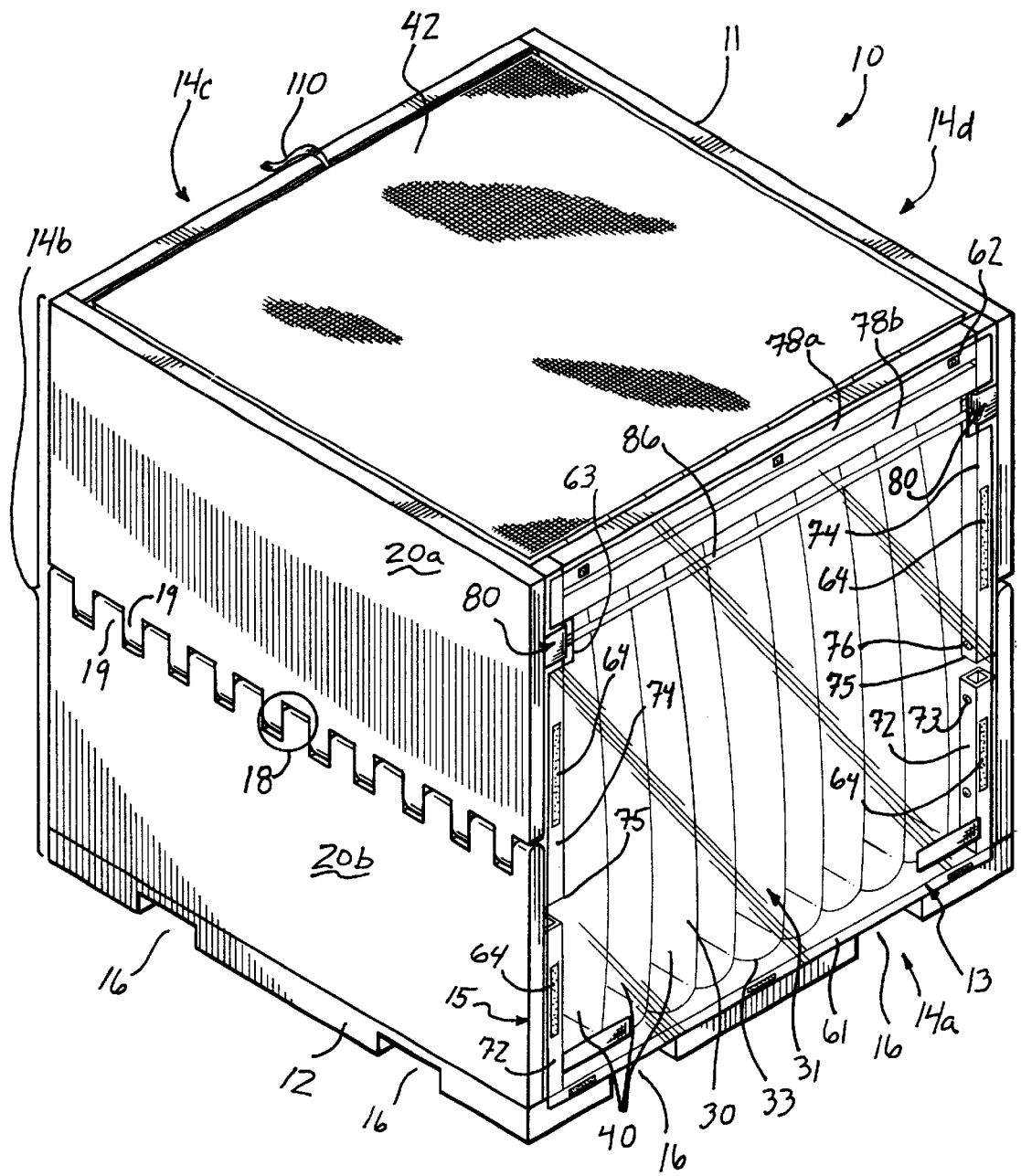
FIG. 1 is a perspective view of an embodiment of the collapsible container of the invention, showing an erected container with a dunnage structure in an erected position for holding product for shipment or allowing access to product at the end use of the container.

FIG. 1 shows a container 10 having a base 12 and a plurality of side structures 14a, 14b, 14c, and 14d. The base 12 may be a pallet-type base having a plurality of slots or grooves 16 formed therein for the forks of a lift truck. In the embodiment of the invention illustrated. The base and side structures 14a–14d make up the overall body of container 10, and therefore the embodiment of the container illustrated in FIG. 1 has a box-like shape. Container 10, and particularly the body of the container, is made of a suitably rugged material, such as a strong, durable plastic. Containers which may be adapted or configured to include various invention features in accordance with the aspects of the present invention, are available from Ropak Corporation of Georgetown, Ky. That is, a Ropak collapsible container may be retrofitted in accordance with the principles of the present invention to yield the inventive container having the various benefits discussed herein. Other collapsible containers might also be appropriately are available of the present invention.

The side structures, 14a–14d are configured for being selectively moved between an erected position and a collapsed position. In the erected position, as shown in FIG. 1, the container is suitable for containing product for shipment. In the collapsed position, as shown in FIGS. 2A, 2B, the size of the container 10 is reduced so that the container may be return shipped in a more cost effective manner. To that end, the side structures 14a–14d in the illustrated embodiment are hinged so that the side structures may be moved to a collapsed position. Therefore, each side structure essentially has a top or upper portion 20a, and a bottom or lower portion 20b. The top portion 20a is hinged inwardly (see FIGS. 2A, 2B) with respect to portion 20b and container 10 to generally reduce the size of the container 10 by half in the collapsed position. The bottom portion 20b remains in a vertically upright position, even when the container is in a collapsed position (see FIGS. 2A, 2B).

In the embodiment illustrated in FIG. 1, the side structures 14b, 14c and 14d will generally be similarly constructed. However, side structure 14a is differently constructed, as discussed further hereinbelow purposes of access to the inside of the container in usage. One suitable hinge structure 18 for hinging the side structures is illustrated in FIG. 1 in which a hinge pin (not shown) would pass through interlocking finger structures 19 formed in the portions 20a, 20b. Other suitable hinge structures could also be utilized. As illustrated in FIG. 1, in the erected position the container resembles a large box structure for containing products therein.

In accordance with one aspect of the present invention, container 10 encloses a dunnage structure 30. The dunnage structure is configured to contain product and therefore may be configured in a number of different ways. Referring to FIG. 1, the dunnage structure 30 is shown as being accessible through one side structure of the invention. The dunnage structure 30 is operably coupled to the side structures and, in the illustrated embodiment, spans between at least two opposing side structures. In the example illustrated in FIG. 1, the dunnage structure 30 spans between side structures 14a and 14c. Preferably, for efficient use of space within container 10, the dunnage structure 30 is also wide enough to fill the space between the opposing side structures 14b and 14d. That is, the dunnage will preferably use as much available space in the container as possible so that a maximum amount of product may be shipped in the container.

The dunnage structure 30 is operably coupled to the side structures, such as 14a and 14c, for moving into an erected position as illustrated in FIG. 1 when the side structures are erected. In the erected position, the dunnage structure receives and contains product for shipment when a container is shipped. In accordance with another aspect of the present invention, the dunnage structure 30 is operably coupled to the side structures 14a, 14c for moving to a collapsed position within the body when the side structures are collapsed. In that way, the dunnage remains with the container when it is returned. When the container is again erected by moving the side structures to an erected position, the dunnage structure is erected and may again be utilized for shipping and containing product, as discussed further hereinbelow. Further discussion of collapsible dunnage is set forth in U.S. Pat. No. 5,725,119, which is incorporated by reference herein in its entirety.

Referring now to FIGS. 2A and 2B, side structure 14a includes a lower or bottom portion 36b and an upper or top portion 36a. The upper portion 36a is hingedly coupled with respect to the container body to be selectively hinged between a collapsed position and erected position, as illustrated in FIGS. 1, 2A and 2B. Referring to FIG. 2A, the upper, or top portion, 36a is shown hinged into a collapsed position. The portion of the dunnage structure supported by top portion 36a also collapses when the side structure 14a is collapsed. Top portion 36a may collapse completely to the bottom or base 12 of container 10. Alternatively, a stop structure (not shown) may be position in the body to prevent portion 36a from hinging or collapsing completely to the bottom of the container, as illustrated in FIG. 2A. In that way, a certain amount of space is maintained for the collapsed portion of the dunnage structure 30, which lies beneath the collapsed side structure 14a. Generally, top portion 36a will collapse below any hinge lines or hinge structures of the side structures 14b, 14d to allow for complete collapsing of the container.

In further collapsing container 10, side structure 14c is collapsed, according to arrow 37. Side structure 14c is coupled to another end of the dunnage structure 30. Therefore, when side structure 14a is collapsed, positioning a portion of dunnage structure 30a therebeneath, the additional portion of dunnage structure 30b lies against structure 14c and collapses therewith. FIG. 14c collapses along hinge structure 18 and the top portion 20a overlies the top portion 36a of side structure 14a (see FIG. 2B). Finally, the side structures 14b, 14d are collapsed as shown by arrows 39 to provide a completely collapsed structure, as shown in FIG. 2B. The hinge lines or hinge structures of the first-collapsing side structures 14a, 14c are generally located below hinge lines or structures of the latter collapsing side structures 14b, 14d, so that the top portions 20a of those side structures may overlie the top portion of the other side structures 14a, 14c. The bottom portions 20b, 36b remain erect in the illustrated embodiment. When the container 10 is collapsed, along with the dunnage, as shown in FIG. 2B, the empty container may be returned in a generally 2:1 ratio with respect to an erected, full container. In that way, shipping and storage costs are reduced. As may be appreciated, the Figures only illustrate one embodiment of a container in accordance with the aspects of the invention. Other different types of containers might be made to include the inventive features.

In accordance with another aspect of the present invention, container 10 and dunnage structure 30 are configured for providing access to the dunnage structure and transfer of product into and out of the dunnage structure container from a side of the container 10. Existing shipping containers provide for access through the top of the container, because all such containers are configured with four generally solid walls and an open top. Consequently, the dunnage structure is arranged to be accessed through the top as well. Therefore, parts removed from prior art containers are removed through the container top, requiring lifting of those parts above the top edge 11 of the container. Such lifting produces additional work for the assembly line worker and further slows the assembly line worker's progress due to the fact that the entire part must be lifted completely clear of the top edge of the container before it may be moved toward the assembly line. Therefore, some existing containers have not been particularly attentive to assembly line workers' needs, reducing the efficiency of the assembly line worker and requiring further tiring motion by way of parts or product lifting.

The present invention addresses various of these drawbacks in the prior art and has an inventive and unique construction for providing side access to parts in the container. To that end, dunnage structure 30 has at least one open end 31 facing toward at least one side structure of the body (see FIGS. 1 and 3). Parts or product in the dunnage structure may be accessed and removed from the container through the open end 31 of the dunnage structure. In that way, product may be moved into and out of the container through a side of container 10. Further in accordance with the aspects of the invention, side structure 14a facing the open end 31 of the dunnage structure, defines an open area which is in alignment with the open end 31. In that way, unhindered access is provided to the interior of the dunnage structure for retrieving parts when the container is erected as shown in FIG. 1.

In one embodiment of the present invention, the dunnage structure 30 comprises a plurality of compartments which are suspended between the side structures (e.g. 14a, 14c) to hang within the container 10 and thereby suspend product within the container. In the embodiment illustrated in FIGS. 1 and 3, the dunnage structure includes pouches 40 which are narrow and are configured to be vertically oriented for vertically receiving parts, such as a door panel. Other orientations and compartment shapes may also be utilized, depending on the product shipped. For example, the compartments might be horizontally oriented to horizontally stack the door panels. The compartments might also be smaller for smaller parts. The compartments may be formed separately, or might be formed as a unitary structure. In the illustrated embodiment, the dunnage structure is formed by sewing various panels together to form the compartments. The dunnage structure is formed of any appropriate flexible and collapsible material, such as a flexible cloth or plastic. In the illustration of FIG. 1, the dunnage structure 30 includes a top sheet 42 to close the compartments at the top. Alternatively, cover 42 might be removable to allow access to product both at the side and top of container 10. The compartments have a bottom 33 to suspend product therein.

Figure 5A:
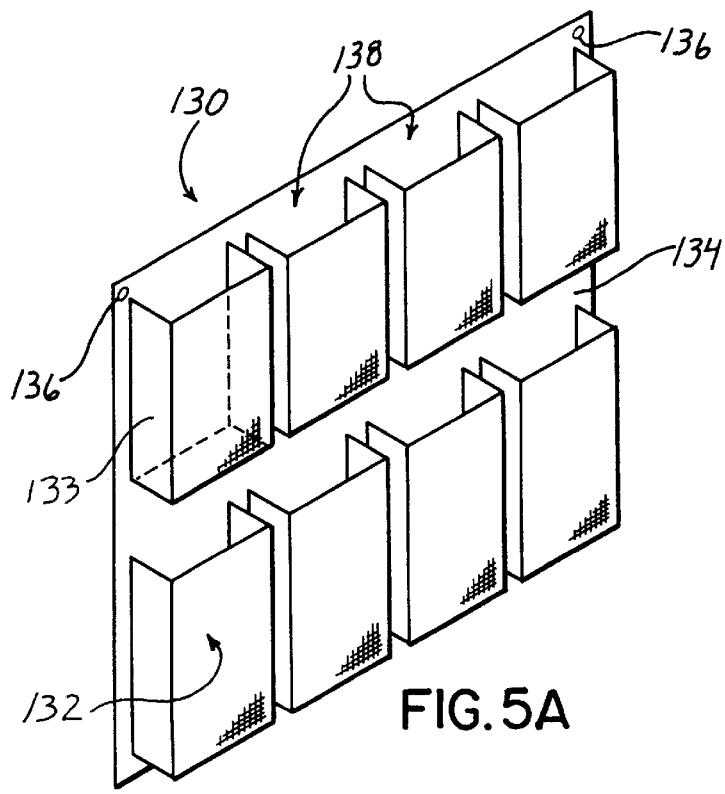
FIGS. 5A and 5B are perspective views of alternative embodiments of the dunnage structure of the present invention.
Figure 5B:
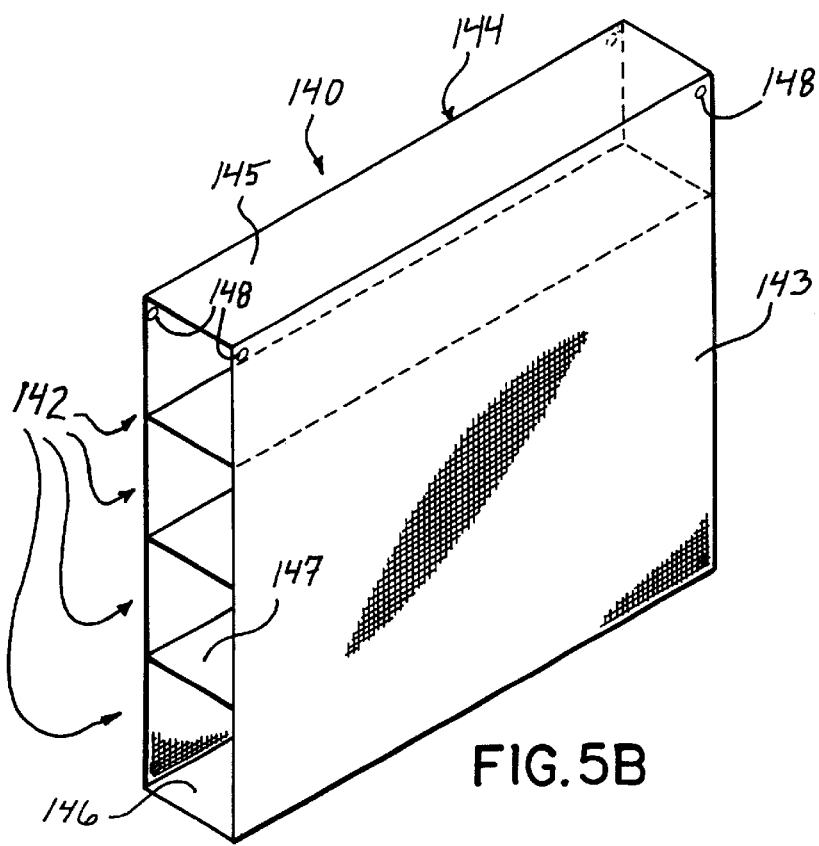

FIGS. 5A and 5B illustrate alternative embodiments of dunnage structures which may be suitably used with the present invention. Specifically, FIG. 5A illustrates one embodiment of a dunnage structure 130 which includes a plurality of compartments or pouches 132 which are coupled to a sheet 134. Sheet 134 includes elements, such as grommets 136, suitable for being coupled to a rail 48, as discussed further hereinbelow. The pouches or pockets 132 are shown configured to be open at their top ends 138. As such, the products within the pouches 132 are removed from the top of the dunnage structure 130. However, the pouches 132 might also be oriented to open from a side thereof 133, wherein the products would be removed from the side of the container. Multiple sheets 134 might be arranged along rail 48 within the container of the present invention to comprise the dunnage of the container.

Figure 3:
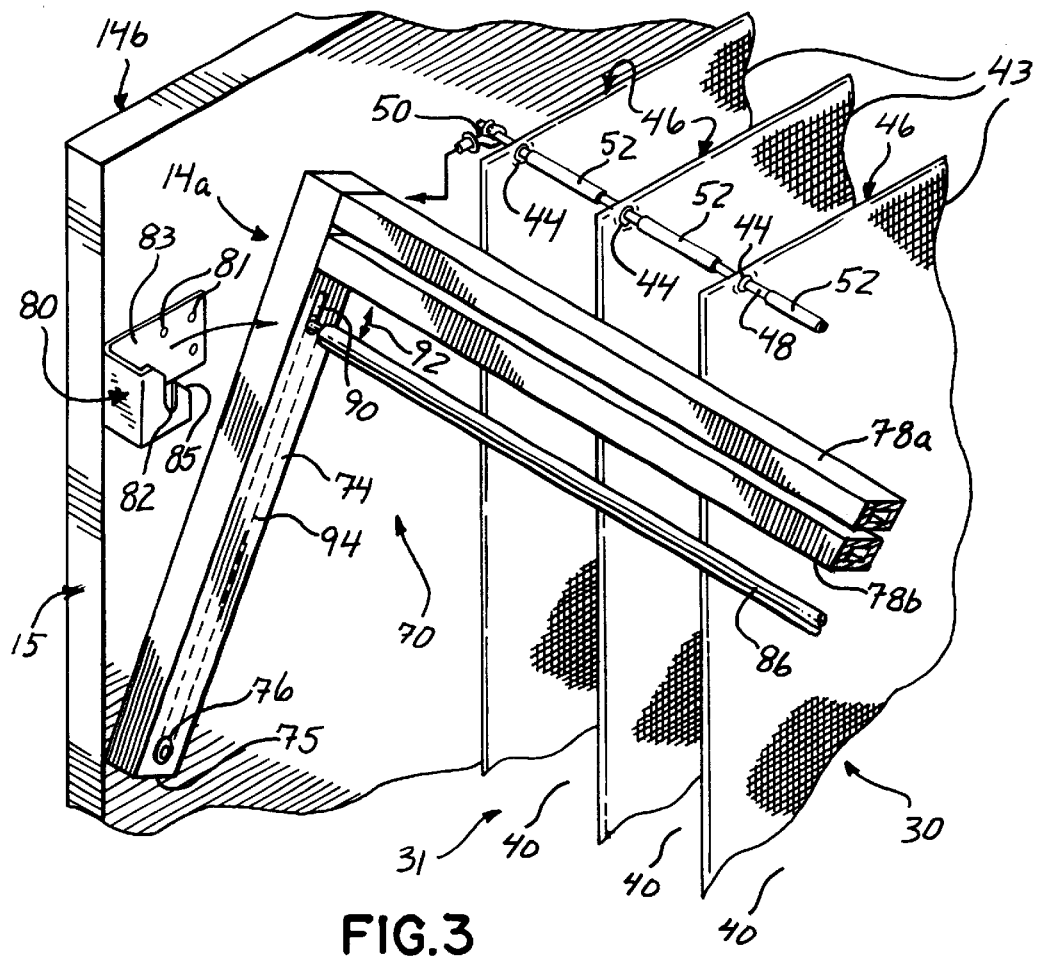
FIG. 3 is a side perspective view of one of the side structures of the present invention, including a latching structure.

Referring to FIG. 5B, another suitable dunnage structure 140 is shown having a plurality of compartments 142 which are disposed generally horizontally. Dunnage structure 140 might be formed with two side sheets 143 and 144 sewn together with the top 145, bottom 146, and walls 147 sewn or otherwise affixed between the sheets 143, 144. Dunnage structure 140 forms a plurality of horizontally disposed compartments 142 which are stacked vertically and are accessible from one or both sides thereof. Grommets, or other elements 148, may couple to a rail 48 for supporting the dunnage structure 140 within the container of the present invention. Referring to FIG. 3, dunnage structure 140 might be secured with open ends of the compartment 142 facing the open side of the container. Dunnage structure 130 in FIG. 5A might be utilized to contain a plurality of small items.

Dunnage structure 140 in FIG. 5B is suitable for containing elongated parts and items. As it will be readily understood by a person of ordinary skill in the art, multiple dunnage structures 130, 140 would be arranged side by side in one embodiment of the present invention. As discussed further hereinabove, the dunnage structure may also take any other suitable form for containing and protecting the items and parts shipped in the container. The container might also include multiple, different dunnage structures rather than all the same structures throughout.

The container of the invention provides side access to an assembly line worker. Parts may be slid out of the dunnage structure 30 from the side and move directly to an assembly line. That is, container may be positioned to face the assembly line such that the motion required to remove a product from the dunnage structure 30 is also the same motion which is required to move the product toward the assembly line to be assembled into position. Therefore, the inventive container 10 increases the efficiency of a worker. Furthermore, the products do not have to be lifted entirely out of container 10 before they can be moved to the assembly line. Therefore, the present container makes an assembly line worker's job easier and less tiring.

FIG. 3 illustrates one embodiment for coupling the dunnage structure to the side structures. Specifically, the dunnage structure 30, and the various compartments utilize vertically oriented sheets 43 which include grommets 44 at the top edge 46 thereof. A rail 48 slides through the grommets to support the sheets. The rail is then coupled to side structure 14a by an appropriate eye bolt 50, or other bracket. In one embodiment, spacers 52 are positioned along the rail between the sides of the pouches to maintain a desired width to the sheets and the open end 31 of each pouch formed by the sheets. When the pouches 40 are configured into a unitary dunnage structure as illustrated, the various pouches will each share at least one side, as illustrated in FIG. 3. The spacers 52 ensure that the pouches each maintain a suitable distance between the pouch sides to allow product to be easily moved in and out of the dunnage structure.

In accordance with another inventive aspect of the present invention, container 10 further includes a flexible, transparent cover 60 overlying the open area of the side structure and the open end of the dunnage structure, as illustrated in FIG. 1. Transparent cover 60 provides protection to the product within the dunnage structure and container, and maintains the product in the dunnage structure. That is, when the cover 60 is in place as shown in FIG. 1, it acts to close the opening of the dunnage structure and open area of the container. Furthermore, the transparency of the cover allows visual access into the container to readily allow the worker to see the parts contained therein. In that way, the container does not have to be opened in shipment or storage for someone to know what products are contained. As noted, the transparent cover 60 closes a side of container 10 and prevents parts from sliding out of the side of the container.

In the embodiment illustrated in the Figures, transparent cover 60 (e.g. vinyl) is attached to the upper edge of side structure 14a by appropriate fasteners, such as rivets 62. At the bottom edge 13 of the container, and or along the side edges 15 of the container, transparent cover 60 may include other fastening structures which allow the transparent cover to be readily removed from the open area of the container and the open ends of the dunnage structure to open side structure 14a. A hook and loop fastener, such as Velcro 64 is suitable as a releasable fastening structure to fasten the bottom and/or side edges of the transparent cover to the corresponding edges 13, 15 of container 10. Velcro strips may therefore be placed around the bottom and side edges of the cover with matching strips along portions of the container, such as along the frame sections forming side structure 14a discussed below (see FIGS. 2A, 2B). When products are to be utilized, the Velcro 64 is stripped away and transparent cover 60 is flipped over the top of the container.

Furthermore, when the container is not in use, the transparent cover 60 acts as a dust cover to prevent dust and other contaminants from getting into the container during storage and return shipment. Specifically, referring to FIG. 2A, when the container is to be collapsed, the transparent cover is again pulled down over the open area of side structure 14a and over the open ends of the dunnage structure. The cover is fastened at its edges to the container with the Velcro 64. In that way, when the side structure 14a is collapsed, the bottom portion of the transparent cover 60 provides a closed side of the collapsed container, as seen in FIG. 2B. As such, dust and other contaminants within the container are reduced. To further provide for easy handling of cover 60, a stiffening member 61 might be used in the bottom edge of the cover to weigh the cover down and provide easier manipulation and closing of the cover using the Velcro 64. A stiffening member 61 might be sewn into the edge of cover 60, for example.

Alternatively, cover 60 may include Velcro fasteners along all edges, including the top edge, of the container, as well. Furthermore, all the edges of cover 60, as well as center sections, might be further reinforced for a more robust construction to help contain any parts in the dunnage structure. Referring to FIG. 1, cover 60 may also include cut-out portions 63 appropriate for accommodating portions of the side structure 14a, as discussed further hereinbelow. Specifically, the cut-out portions 63 allow the side structure 14a to engage latching structure 80.

In the embodiment of container 10 illustrated in the Figures, side structures 14a and 14c are coupled to side structures 14b and 14d so that the container remains erect. Once side structures 14a and 14c are collapsed, then the side structures 14b and 14d will be free to collapse as well.

Referring to FIG. 3, one embodiment of side structure 14a is more closely shown and a suitable means for coupling side structure 14a into an erected position is illustrated. Specifically, side structure 14a is formed by a frame 70 comprised of various different frame sections. Metal is a suitable material for the frame 70. The bottom portion 36b of side structure 14a is formed by opposing frame sections 72 which are fastened to the adjacent side structure by appropriate side structures, such as rivets 73. The top portion 36a of side structure 14a is formed by similar frame sections 74 which are hingedly coupled to adjacent side structures at the hinge end 75 by appropriate hinge pins 76. An elongated frame section 78a spans between the sections 74 along a top edge 11 of the container body. The embodiment illustrated in the drawings comprises an additional elongated frame section 78b spanning between the side frame sections 74. In that way, the various sections of frame 70 peripherally surround the open side of the container and define an open area of the side structure which is in alignment with the open end of the dunnage structure 30 to provide access to parts within the dunnage structure, as discussed above. The upper frame sections 74, 78a, 78b are welded together and are collectively hingedly coupled with respect to the body to be selectively hinged between an erected position shown in FIG. 1, and a collapsed position as shown in FIGS. 2A and 2B. FIG. 3 illustrates the upper portion 36a of side structure 14a being hinged between the erected and collapsed positions.

Figure 3A:
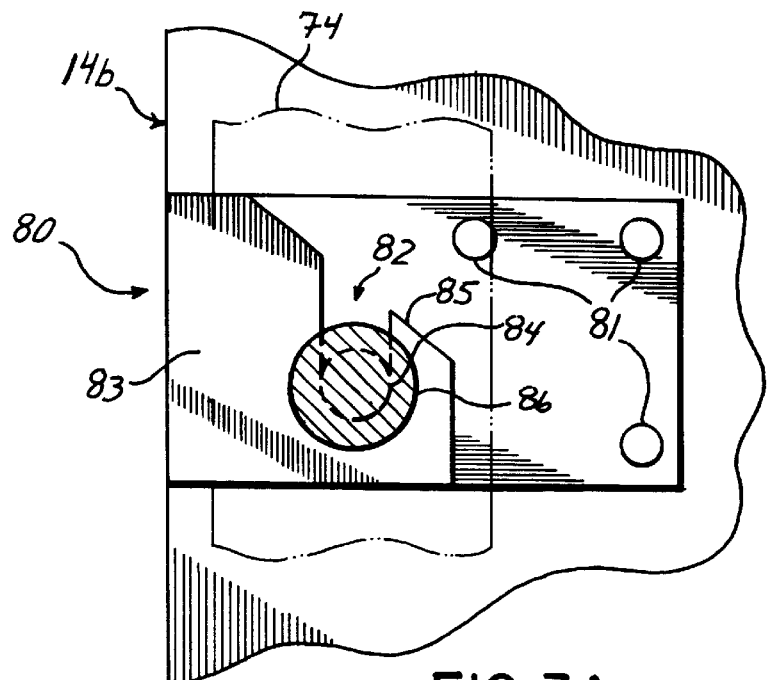
FIG. 3A is a side view of a latching structure in accordance with the principles of the present invention.

In accordance with another aspect of the present invention, container 10 includes a latching structure 80 on the body for securing the side structure 14a in an erected position. Specifically, the upper portion 36a of the side structure 14a is secured in the erected position by the latching structure. Latching structure 80 comprises an aperture 82 formed by a bracket 83 which may be fixed to side structure 14b, such as by appropriate fasteners 81. Alternatively, the bracket or other structure defining the aperture might also be integrally formed with a side structure 14b. Latching structure 80 further comprises a member 86 configured to engage the aperture for securing the side structure in the erected position. Specifically, referring to FIG. 3A, one suitable aperture is in the form of a slot 82, wherein the engaging member 84 is latching bar 86 with ends 84 which are configured to slide into the slot. Latching bar 86 is slidably coupled to the top portion of the frame. Appropriate latching brackets 83 with slots 82 are positioned on opposite ends of the side structure to secure the side structure from two ends. Referring to FIG. 3, a latching bar 86 spans between ends of the side structure 14a. The ends 84 of the latching bar 86 are coupled to associated frame sections 74. The ends 84 of latching bar 86 pass through appropriate slots 90 formed within the frame sections 74 of side structure 14a. The latching bar 86 moves up and down within slots 90 for engaging and disengaging the aperture 82 of the latching bracket 83. Specifically, the ends 84 of the bar 86 slide into apertures or slots 82. As illustrated in FIG. 34, the bracket 83 of latching structure 80 has a sloped front edge 85 preceding aperture 82. Front edge 85 helps to guide the bar 86 and ends 84 into the apertures 82 when the side structure 14a is erected. The ends 84 may be smaller than the rest of bar 86, as illustrated in FIGS. 3 and 3A, for more readily engaging and disengaging the slots 82.

Referring again to FIG. 3, when the side structure 14a is erected, the latching bar 86 and ends 84 are in their lowermost position with the ends sitting within apertures 82. To disengage the ends from the apertures, the latching bar 86 is lifted, as shown by arrow 92 in FIG. 3, to lift the ends 84 out of the apertures 82 and thereby allow the upper portion 36a of the side structure 14a to hinge inwardly into the container to collapse side structure 14a. As may be appreciated, the latching mechanism of the present invention might be otherwise configured such that the aperture 82 of the latching structure 80 may otherwise be engaged. For example, aperture 82 might be a hole where an end 84 slides in and out of the hole by actuation of an element, such as latching bar 86 or some other appropriate element. Other latching structures might also be utilized, and the present invention is not limited to the structure as shown in the drawings. The present invention provides an advantage by allowing one hand disengagement of the side structure 14a from the adjacent side structures 14b and 14d and thereby allows one-handed collapsing of the side structure 14a for ease of operation. A worker may simply grab the latching bar 86 and pull it upwardly or in some other direction, in the embodiment illustrated in the Figures, in order to disengage the bar from the latching structure to collapse the side structure 14a.

In the erected position, the weight of the latching bar 86 will generally keep the ends 84 within the apertures 82. However, in one embodiment of the invention, the latching bar 86 and ends 84 may be biased downwardly, such as by a spring-like mechanism. As illustrated in FIG. 3, an elastic cord 94 is coupled between hinge pin 76 and the latching bar 86 and ends 84 to pull the bar ends 84 downwardly within aperture 82. In that way, inadvertent disengagement of the latching structure is reduced. As will be appreciated, the construction illustrated in FIG. 3 is for one side of the side structure 14a and may be generally duplicated on the other side by one of ordinary skill in the art.

Figure 4:
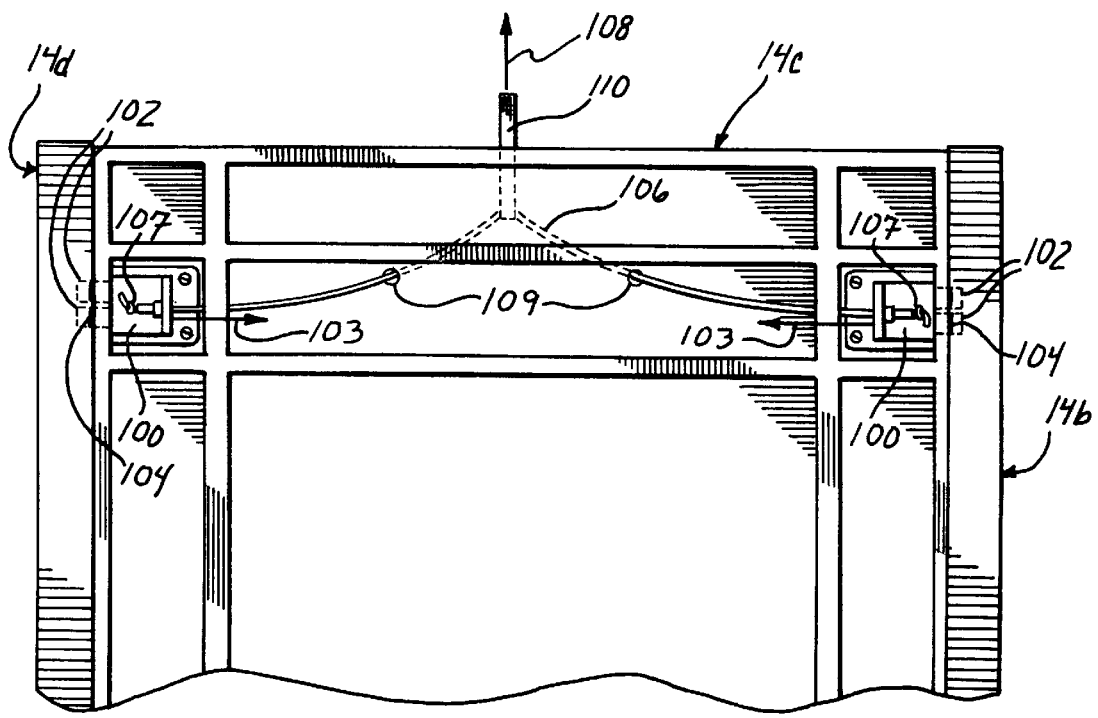
FIG. 4 is a side view of the present invention disclosing a latch for securing the side structure in the erected position in accordance with the principles of the present invention.

FIG. 4 illustrates a mechanism suitable for latching another side structure, such as side structure 14c, between a collapsed and erected position. Specifically, side structure 14c comprises a latch 100 having at least one latch projection 102. In the embodiment illustrated in FIG. 4, multiple latch projections 102 are utilized. The latch is slidably coupled to the side structure, as illustrated by arrows 103 in FIG. 4. One slidable latch is described. However, as illustrated in FIG. 4, a similar slidable latch is utilized on either end of side structure 14c for securing the side structure in the erected position on both ends. One or more slots 104 are formed in the body of the container. For example, the slots might be formed in the opposing side structures 14b and 14d. The latch projections 102 slide into the slots for securing the side structures 14b, 14c, and 14d in the erected position. Such slidable latches are commercially available in containers available from Ropak, as mentioned above. Other latching mechanisms might also be utilized in accordance with the principles of the present invention. In prior art containers, each latch 100 has to be disengaged separately or simultaneously by both hands of a person as they collapse the side wall of the container. Due to the physical size of the container and the position of the latches, a person has to position themselves generally facing side structure 14c to simultaneously disengage the latches so that the container may be collapsed. As may be appreciated, requiring the worker to move around to opposite sides of the container is undesirable and is costly from a labor standpoint, as it adds additional steps in erecting and collapsing the container.

In accordance with another aspect of the present invention, an actuating mechanism is coupled to the latches so that the latches may be simultaneously unlatched from the opposite side of the container. That is, the entire container may be collapsed from one side, such as the side of the container defined by side structure 14a. More specifically, as shown in FIG. 4, the actuating mechanism, such as a cord 106 extends between two of the latches 100 and is coupled thereto by an appropriate fastening structure 107. Pulling the cord forwardly or upwardly, as illustrated by arrow 108 slides each of the latches 100 so that their projections 102 are disengaged from the slots 104. Since the person collapsing the container will be on the side of the container adjacent side structure 14a, the cord of the actuating mechanism will generally be pulled toward side structure 14a. Cord 106 is accessible from the inside of the container and may pass through holes 109 formed in the container to engage the externally mounted latches 100. In the embodiment illustrated in FIG. 4, the actuating mechanism may further include a handle structure 110 coupled to the cord 106 for ease of actuation. The handle structure and/or cord extends upwardly between the dunnage structure 30 and side structure 14c as illustrated in FIG. 1. Therefore, the handle or cord is accessible to a person collapsing the container from the side 14a of the container. After side structure 14a has been collapsed, as illustrated in FIG. 2A, a person may then reach over and engage the handle structure 110, pulling it forwardly to disengage the latches 100.

Figure 4A:
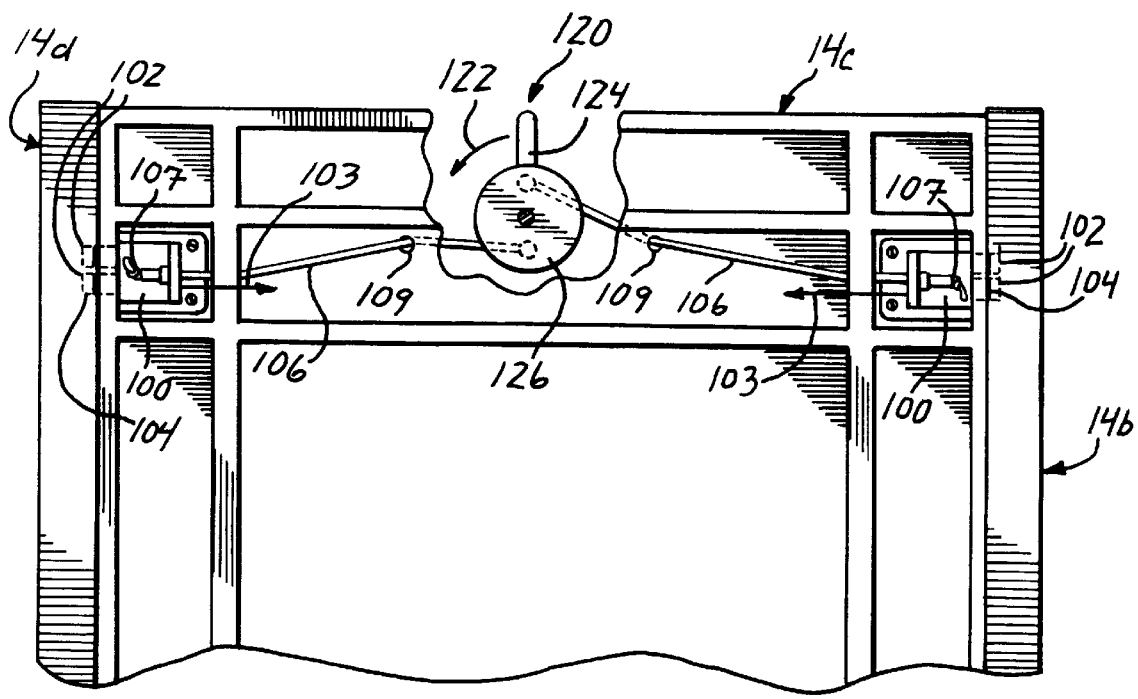
FIG. 4A s a side view of an alternative embodiment of a latch for securing a side structure.

FIG. 4A illustrates another embodiment in accordance with the principles of the present invention for simultaneously unlatching one side of container 10 from an opposite side. As discussed above with respect to FIG. 4, cords 106 may extend between the various latches 100. In accordance with another aspect of the present invention, the actuating mechanism may include a lever structure 120 which may be rotated according to arrow 122. Specifically, lever mechanism 120 might include a handle 124 which is accessible from an opposite side of the container. When the handle is rotated in one direction, a wheel portion 126 also rotates. The cords 106 are coupled to the wheel portion 126 so as to be drawn when it is rotated according to arrow 122. In that way, both of the latches 100 at either end of side structure 14c may be disengaged so that the side structure may be moved to a collapsed position. As noted above, once side structures 14a and 14c have been moved to a collapsed position, the remaining side structures 14b and 14d may be folded inwardly to provide a collapsed container as illustrated in FIG. 2B.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader is not limited to the specific details representative apparatus and method, and illustrative examples shown and described. Accordingly, departures may be made from such details without departure from the spirit or scope of applicant's general inventive concept.

What is claimed is:

1. A reusable and returnable container for holding product therein during shipment and then being returned for reuse, the container comprising:
    a body having at least two opposing and moveable side structures, the side structures configured for being selectively moved into an erected position for shipment and moved into a collapsed position for reducing the size of the container for return;
    a dunnage structure spanning between the side structures, the dunnage structure being operably coupled to the side structures for automatically moving, with the side structures, to an erected position for receiving product when the side structures are erected and moving to a collapsed position in the body when the side structures are collapsed so that the dunnage remains with the container when returned;
    the dunnage structure having an open end facing at least one side structure of the body, the at least one side structure defining an open area which is in alignment with the dunnage structure open end for accessing the dunnage structure and transferring product into and out of the dunnage structure from a side of the container;
    whereby a person may more efficiently and safely remove product from the container and the container and dunnage is readily reused.

2. The container of claim 1 wherein said at least one side structure comprises an elongated frame section positioned along a top edge of the body, the dunnage structure being coupled to the elongated frame section, an open area defined below the frame section for accessing the open end of the dunnage structure.

3. The container of claim 2 wherein said frame section is hingedly coupled with respect to the body to be selectively hinged between a collapsed and erected position.

4. The container of claim 1 further comprising a latching structure coupled to the body for securing at least one of said side structures in the erected position.

5. The container of claim 4 wherein said latching structure comprises an aperture positioned on the body, and a member coupled to the side structure and configured to engage the aperture for securing the side structure in the erected position.

6. The container of claim 5 wherein said aperture is in the form of a slot, the member comprising a latching bar movably coupled to the side structure, a portion of the latching bar being configured to slide into the slot.

7. The container of claim 5 further comprising a bracket which defines said aperture, the bracket being coupled to the body.

8. The container of claim 6 wherein said latching bar is biased for engaging the aperture.

9. The container of claim 1 further comprising a generally transparent cover overlying said open area of the at least one side structure for closing the side structure while providing visual access to the dunnage structure and any contents therein.

10. The container of claim 1 further comprising rails coupled to the side structures, the dunnage structure being coupled at its ends to the rails to span between the rails.

11. The container of claim 10 wherein said dunnage structure comprises a plurality of compartments coupled at their ends to the rails, the compartments being slidable along said rails.

12. The container of claim 10 wherein said dunnage structure comprises a plurality of pouches coupled at their ends to the rails, spacers being positioned between at least two of the pouches for separating the pouches on the rails.

13. The container of claim 1 further comprising a latch, the latch coupled to at least one of the side structures, and being engageable with an adjacent side structure for securing the side structure in the erected position.

14. The container of claim 13 further comprising an actuating mechanism, the actuating mechanism being coupled to the latch and actuatable to disengage the latch so that the side structure may be moved to a collapsed position.

15. The container of claim 14 wherein said actuating mechanism comprises a cord operably coupled to the latch such that pulling the cord disengages the latch.

16. The container of claim 14 wherein said actuating mechanism comprises a lever operably coupled to the latch such that moving the lever disengages the latch.

17. The container of claim 9 wherein said cover is flexible to collapse with the side structure in the collapsed position, a portion of the cover remaining over a portion of said open area for preventing undesired contaminants from entering the container when it is collapsed.

18. The container of claim 9 wherein said cover is movably coupled to the body for being moved from at least a portion of the open area to allow access to contents of the dunnage structure.

19. A reusable and returnable container for holding product therein during shipment and then being returned for reuse, the container comprising:
    a body having at least two opposing and moveable side structures which are configured for being selectively moved into an erected position for shipment and moved into a collapsed position for reducing the size of the container for return;
    at least one side structure comprising an open frame with a section hingedly coupled with respect to the body to be selectively hinged between the collapsed and erected positions;
    a dunnage structure spanning between the side structures, the dunnage structure being operably coupled to the open frame for moving to an erected position for receiving product when the frame is erected and moving to a collapsed position in the body when the frame is collapsed so that the dunnage remains with the container when returned;

the dunnage structure having an open end facing the open frame, the frame defining an open area which is in alignment with the dunnage structure open end for accessing the dunnage structure and transferring product into and out of the dunnage structure from a side of the container;

whereby a person may more efficiently and safely remove product from the container and the container and dunnage is readily reused.

20. A reusable and returnable container for holding product therein during shipment and then being returned for reuse, the container comprising:

a body having at least two opposing and moveable side structures which are configured for being selectively moved into an erected position for shipment and moved into a collapsed position for reducing the size of the container for return;

a dunnage structure spanning between the side structures, the dunnage structure being operably coupled to the side structures for moving to an erected position for receiving product when the side structures are erected and moving to a collapsed position in the body when the side structures are collapsed so that the dunnage remains with the container when returned;

the dunnage structure having an open end facing at least one side structure of the body, the at least one side structure defining an open area which is in alignment with the dunnage structure open end for accessing the dunnage structure and transferring product into and out of the dunnage structure from a side of the container;

a flexible cover overlying said open area for closing the side structure, the cover operable to collapse with the side structure in the collapsed position while remaining over a portion of said open area for preventing undesired contaminants from entering the container when it is collapsed.

whereby a person may more efficiently and safely remove product from the container and the container and dunnage is readily reused.

* * * * *

(12) EX PARTE REEXAMINATION CERTIFICATE (8480th)
United States Patent
Bazany et al.

(10) Number: US 6,540,096 C1
(45) Certificate Issued: Aug. 23, 2011

(54) COLLAPSIBLE CONTAINER WITH INTEGRALLY SUPPORTED DUNNAGE AND SIDE ENTRY

(75) Inventors: Donald J. Bazany, Grand Haven, MI (US); Judson A. Bradford, Holland, MI (US)

(73) Assignee: Bradford Company, Holland, MI (US)

Reexamination Request:
No. 90/011,142, Aug. 5, 2010

Reexamination Certificate for:
Patent No.: 6,540,096
Issued: Apr. 1, 2003
Appl. No.: 09/583,486
Filed: May 31, 2000

Related U.S. Application Data

(60) Continuation-in-part of application No. 09/532,580, filed on Mar. 22, 2000, now Pat. No. 6,230,916, which is a division of application No. 09/033,680, filed on Mar. 3, 1998, now Pat. No. 6,062,410, which is a division of application No. 08/608,476, filed on Feb. 28, 1996, now Pat. No. 5,725,119.

(51) Int. Cl.
*B65D 6/18* (2006.01)

(52) U.S. Cl. .............................. 220/6; 206/583; 220/1.6; 220/23.83; 220/530

(58) Field of Classification Search ........................ 220/6
See application file for complete search history.

(56) References Cited

U.S. PATENT DOCUMENTS 5,725,119 A    3/1998    Bradford et al.

6,648,142 B1 * 11/2003    Hugenholtz et al. ......... 206/425
7,878,345 B2 *  2/2011    Tourlamain .................. 211/195

FOREIGN PATENT DOCUMENTS

| DE | 4024607 | 8/1990 |
| EP | 0865991 | 9/1998 |
| JP | H6-59230 U | 8/1994 |
| WO | WO 93-10024 | 5/1993 |

OTHER PUBLICATIONS conTeyor Multibag Systems Brochure with IEPER references, publically distributed by conTeyor before May 31, 1999 (the "conTeyor Brochure referencing IEPER"). See the "Van Bree Decl." of Exhibit G.

* cited by examiner

*Primary Examiner*—William Doerrler

(57) ABSTRACT

A reusable and returnable container for holding product therein during shipment and then being returned for reuse comprises a body having at least two opposing and moveable side structures, which are configured for being selectively moved into an erected position for shipment and moved into a collapsed position for reducing the size of the container for return. A dunnage structure spans between the side structures and is operably coupled to the side structures for moving to an erected position for receiving product when the side structures are erected and moving to a collapsed position in the body when the side structures are collapsed so that the dunnage remains with the container when returned. The dunnage structure has an open end facing at least one side structure of the body, and the side structure defines an open area which is in alignment with the dunnage structure open end for accessing the dunnage structure and transferring product into and out of the dunnage structure from a side of the container.

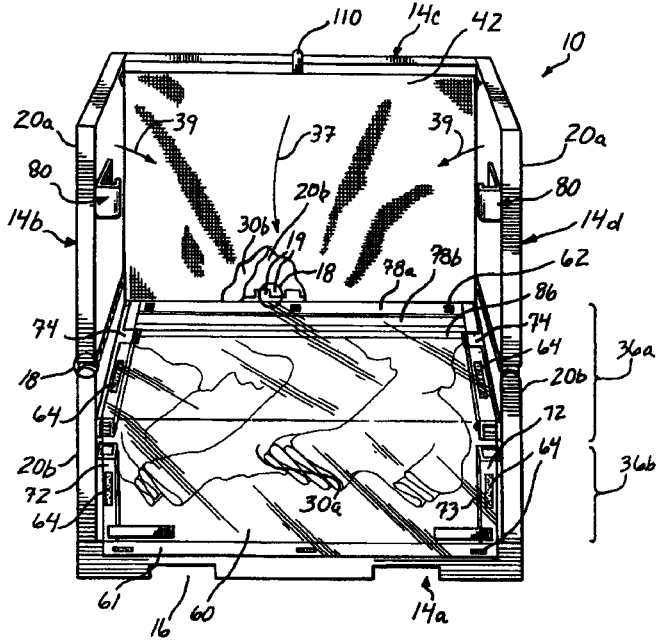

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 4, 10, 11 and 19 is confirmed.

Claims 2, 3, 5-9, 12-18 and 20 were previously disclaimed.

* * * * *